United States Patent
Wada et al.

(10) Patent No.: US 11,149,163 B2
(45) Date of Patent: Oct. 19, 2021

(54) HEAT EXCHANGER AND METHOD FOR HYDROPHILIZING HEAT EXCHANGER

(71) Applicant: NIPPON PAINT SURF CHEMICALS CO., LTD., Tokyo (JP)

(72) Inventors: Yuko Wada, Tokyo (JP); Hitoshi Kayama, Tokyo (JP); Masahiko Matsukawa, Tokyo (JP)

(73) Assignee: NIPPON PAINT SURF CHEMICALS CO., LTD., Tokyo (JP)

( * ) Notice: Subject to any disclaimer, the term of this patent is extended or adjusted under 35 U.S.C. 154(b) by 177 days.

(21) Appl. No.: 16/464,605

(22) PCT Filed: Nov. 29, 2017

(86) PCT No.: PCT/JP2017/042891
§ 371 (c)(1),
(2) Date: May 28, 2019

(87) PCT Pub. No.: WO2018/101355
PCT Pub. Date: Jun. 7, 2018

(65) Prior Publication Data
US 2020/0148909 A1    May 14, 2020

(30) Foreign Application Priority Data

Dec. 2, 2016  (JP) .............................. JP2016-235401

(51) Int. Cl.
| | | |
|---|---|---|
| *C09D 129/06* | (2006.01) | |
| *C09D 7/61* | (2018.01) | |
| *C09D 4/06* | (2006.01) | |
| *C09D 5/00* | (2006.01) | |
| *C09D 129/04* | (2006.01) | |
| *C09D 5/08* | (2006.01) | |
| *C09D 171/02* | (2006.01) | |
| *C08K 3/22* | (2006.01) | |
| *C08F 2/44* | (2006.01) | |
| *B05D 3/02* | (2006.01) | |
| *B05D 7/16* | (2006.01) | |
| *F28F 13/18* | (2006.01) | |
| *F28F 21/08* | (2006.01) | |

(52) U.S. Cl.
CPC ......... *C09D 129/06* (2013.01); *B05D 3/0254* (2013.01); *B05D 7/16* (2013.01); *C09D 4/06* (2013.01); *C09D 5/00* (2013.01); *C09D 5/084* (2013.01); *C09D 7/61* (2018.01); *C09D 129/04* (2013.01); *C09D 171/02* (2013.01); *F28F 13/18* (2013.01); *F28F 21/084* (2013.01); *C08F 2/44* (2013.01); *C08K 3/22* (2013.01); *F28F 2245/02* (2013.01)

(58) Field of Classification Search
CPC ........................... C09D 129/04; F28F 2245/02
See application file for complete search history.

(56) References Cited

U.S. PATENT DOCUMENTS

| 6,869,677 B1 | 3/2005 | Uehara et al. |
|---|---|---|
| 10,676,632 B2 * | 6/2020 | Umeda ................. C08L 51/003 |
| 2003/0037914 A1 | 2/2003 | Inbe et al. |
| 2003/0039849 A1 | 2/2003 | Inube et al. |
| 2003/0039850 A1 * | 2/2003 | Inbe ........................ C09D 7/67 |
| | | 428/457 |

FOREIGN PATENT DOCUMENTS

| EP | 1329535 A1 | 7/2003 |
|---|---|---|
| EP | 2 862 634 A1 | 4/2015 |
| EP | 3187271 A1 | 7/2017 |
| JP | 2000-345362 A | 12/2000 |
| JP | 2002-241963 A | 8/2002 |
| JP | 2002-285139 A | 10/2002 |
| JP | 2011148889 A | 8/2011 |
| JP | 2014-000534 A | 1/2014 |
| JP | 2015-131389 A | 7/2015 |
| WO | WO-2016/002484 A1 | 1/2016 |
| WO | WO-2016195098 A1 * | 12/2016 ........... C09D 129/04 |

OTHER PUBLICATIONS

European Search Report dated Jul. 15, 2020 in EP application No. 17876427.0.

* cited by examiner

*Primary Examiner* — Brieann R Johnston
(74) *Attorney, Agent, or Firm* — Muncy, Geissler, Olds & Lowe, P.C.

(57) ABSTRACT

The present invention provides a heat exchanger which is imparted with high deodorizing properties in terms of cigarettes. A heat exchanger which has a hydrophilic coating film on the surface of a substrate that is formed from aluminum, and wherein the hydrophilic coating film is formed using a hydrophilizing agent that contains 0.8-1.8% by mass of a vanadium compound in terms of elemental vanadium, while containing 90% by mass or more of a resin which contains 38-40% by mass of a polyvinyl alcohol having an ethylene chain, 22-24% by mass of a radically polymerizable monomer having a carboxylic acid, 15-17% by mass of a radically polymerizable monomer represented by general formula and 22-24% by mass of a polyethylene glycol.

5 Claims, No Drawings

HEAT EXCHANGER AND METHOD FOR HYDROPHILIZING HEAT EXCHANGER

TECHNICAL FIELD

The present invention relates to a heat exchanger having a hydrophilic coating on a surface of an aluminum base material of the heat exchanger, and a method for hydrophilizing the heat exchanger.

BACKGROUND ART

In order to improve efficiency in heat exchange, an aluminum heat exchanger used for an automotive air conditioner is generally provided with a plurality of fins provided with tubes used to provide a refrigerant. The plurality of fins are narrowly spaced so that the surface area of the heat exchanger is as large as possible, and the tubes are arranged intricately among the fins.

When the surface of a base material of a heat exchanger is less hydrophilic, due to condensed water, arising from moistures in the air, becoming attached to the surfaces of the fins and tubes during operation of an air conditioner, a smooth flow of exhaust air may be interrupted resulting in a decrease in the efficiency of heat exchange or an odor may occur from the heat exchanger. This is the reason that the surface of the base material of the heat exchanger is hydrophilized.

For example, a technology has been proposed in which a base material of a heat exchanger is coated with a resin (coating) that includes: a graft polymer obtained by graft polymerizing polyvinyl alcohol and vinylpyrrolidone; an anionic polymer including a sulfonic acid (sulfonate) or a carboxylic acid (carboxylate) as a polymerization component; and a crosslinker (for example, refer to Patent Document 1). Using the technology disclosed in Patent Document 1, high hydrophilicity is maintained on the surface of the base material of the heat exchanger for a long time.

[Patent Document 1] Japanese Unexamined Patent Application, Publication No. 2015-131389

DISCLOSURE OF THE INVENTION

Problems to be Solved by the Invention

However, whether the resin (coating) disclosed in Patent Document 1 has high odor resistance to a unique odor included in cigarette smoke, is not sufficiently discussed. Thus, regarding the heat exchanger disclosed in Patent Document 1, there is room for improvement in odor resistance in regard to cigarette smoke.

In light of the descriptions above, an object of the present invention is to provide a heat exchanger having a high odor resistance in regard to cigarette smoke.

Means for Solving the Problems

The present invention provides a heat exchanger having a hydrophilic coating on a surface of an aluminum base material of the heat exchanger, the hydrophilic coating being formed using a hydrophilizing agent comprising: 90% by mass or more of a resin (D); and 0.8 to 1.8% by mass of a vanadium compound (E), calculated based on a vanadium element, wherein the resin (D) comprises: 38 to 40% by mass of polyvinyl alcohol (A) having an ethylene chain; 22 to 24% by mass of a radically polymerizable monomer (B1) having a carboxylic acid; 15 to 17% by mass of a radically polymerizable monomer (B2) represented by Formula (1) below; and 22 to 24% by mass of polyethylene glycol (C).

$$CH_2=C(R^1)CO-(OCH_2CH_2)m-OR^2 \tag{1}$$

where $R^1$ represents H or $CH_3$, $R^2$ represents H or $CH_3$, and m represents an integer from 1 to 200.

Further, it is preferable that an attached amount of the hydrophilic coating be from 0.5 to 2.0 $g/m^2$.

The present invention provides a method for hydrophilizing the heat exchanger, the method comprising: coating the surface of the heat exchanger with the hydrophilizing agent; and drying the heat exchanger after the coating so as to form a hydrophilic coating.

Further, it is preferable that the coating include coating the surface of the heat exchanger with the hydrophilizing agent such that an attached amount of the hydrophilizing agent after the drying is from 0.5 to 2.0 $g/m^2$.

Furthermore, it is preferable that the drying include drying the heat exchanger at a temperature from 140 to 170° C. after the coating.

Effects of the Invention

The present invention makes it possible to provide a heat exchanger having a high odor resistance in regard to cigarette smoke.

PREFERRED MODE FOR CARRYING OUT THE INVENTION

Embodiments of the present invention will now be described below. Please note that the present invention is not limited to the embodiments described below.

<Heat Exchanger>

Using a hydrophilizing agent, a coating is formed on a surface of an aluminum base material of a heat exchanger according to the embodiments. As used herein, the aluminum base material refers to a base material made from aluminum or from an aluminum alloy containing aluminum as a primary component.

The heat exchanger according to the embodiments is provided with fins and tubes, the fins and the tubes including an aluminum base material and being joined by, for example, the known NB (Nocolok brazing) process in which brazing is performed under nitrogen gas. A flux used in the NB process is not particularly limited as long as it is a flux containing a salt constituted of anion forming a sparingly soluble salt together with a lithium ion, and a normal halogen-based flux used in the NB process may be used. Examples of the halogen-based flux include $KAlF_4$, $K_2AlF_5$, $K_3AlF_6$, $CsAlF_4$, $Cs_3AlF_6$, and $Cs_2AlF_5$, as well as mixtures of at least two of them.

A coating is formed on the heat exchanger according to the embodiments using a hydrophilizing agent including a resin (D) and a vanadium compound (E).

<Resin>

A resin (D) according to the embodiments includes polyvinyl alcohol (hereinafter also referred to as "EVOH") (A), a radical polymer (B), and polyethylene glycol (C).

EVOH (A) includes ethylene units and vinyl alcohol units. The content of ethylene unit in EVOH (A) is preferably 30 to 36% by mole. The content of ethylene unit in this range will make it possible to obtain a resin (D) having a high odor resistance in regard to cigarette smoke while maintaining the essential properties of EVOH.

A commercially available EVOH may be used as EVOH (A). Examples of the commercially available EVOH include "EVAL™" manufactured by Kuraray Co., Ltd., and "Soarnol™" manufactured by The Nippon Synthetic Chemical Industry Co., Ltd.

Examples of the radical polymer (B) include a radically polymerizable monomer (B1) including a carboxylic acid, and a radically polymerizable monomer (B2) represented by Formula (1) below (the radically polymerizable monomer (B1) is hereinafter also referred to as a "carboxylic monomer" and the radically polymerizable monomer (B2) is hereinafter also referred to as an "ethylene oxide-based monomer (B2)").

$$CH_2=C(R^1)CO-(OCH_2CH_2)m\text{-}OR^2 \quad (1)$$

where $R^1$ represents H or $CH_3$, $R^2$ represents H or $CH_3$, and m represents an integer from 1 to 200.

The radically polymerizable monomer (B1) is obtained by radically polymerizing a radically polymerizable carboxylic monomer. Examples of the radically polymerizable monomer (B1) include unsaturated monocarboxylic acids such as acrylic acid, methacrylic acid, crotonic acid, and cinnamic acid; unsaturated dicarboxylic acids such as maleic acid, itaconic acid, fumaric acid, citraconic acid, and chloromaleic acid, as well as anhydrides thereof; and monoesters of an unsaturated dicarboxylic acid such as monomethyl maleate, monoethyl maleate, monobutyl maleate, monomethyl fumarate, monoethyl fumarate, monomethyl itaconate, monoethyl itaconate, and monobutyl itaconate. One of them may be used alone or at least two of them may be used in combination. Further, metallic salts or ammonium salts thereof may be used. From among them, acrylic acid and methacrylic acid are particularly preferably used.

The radically polymerizable monomer (B2) is a radically polymerizable monomer including ethylene oxide represented by Formula (1) described above.

As represented by Formula (1) described above, the radically polymerizable monomer (B2) is (poly)ethyleneglycol mono(meth)acrylate or methoxy polyethyleneglycol (meth)acrylate, or has an amide bond, where m is an integer from 1 to 200. This imparts hydrophilicity and dispersion stability to the radically polymerizable monomer (B2).

The radical polymer (B) may be a copolymer of a first monomer group including a carboxylic monomer (B1) as an essential component and a second monomer group including an ethylene oxide-based monomer (B2) as an essential component, or a mixture of a copolymer of the first monomer group and a copolymer of the second monomer group. A resin (D) having hydrophilicity and an excellent dispersion stability can be obtained from such a radical polymer (B). Regarding the type of copolymer, any of a random copolymer, a graft copolymer, and a block copolymer is acceptable.

Polyethylene glycol (C) has a structure represented by Formula (2) below. The resin (D) is imparted with hydrophilicity and dispersion stability by including polyethylene glycol (C).

$$R^3O(CH_2CH_2O)_n- \quad (2)$$

where $R^3$ represents H or $CH_3$, and n represents an integer from 2 to 100,000.

The contents of polyvinyl alcohol (A), a carboxylic monomer (B1), an ethylene oxide-based monomer (B2), and polyethylene glycol (C) are adjusted such that the resin (D) can impart, to a heat exchanger, a high odor resistance in regard to cigarette smoke.

The cigarette smoke odor is considered to be associated with volatilization of condensed water on the surface of a base material of a heat exchanger. During air blowing, only an odors substance adsorbed to the surface of the base material becomes airborne. However, when the heat exchanger starts operating, condensation water will occur and the odors substance is replaced leading to the generation of an odor. Further, when the heat exchanger stops operating and only air blowing is continued, water will start to evaporate, and an odors substance dissolved in the water will then start smelling. Furthermore, when the surface of the base material is dried out, a condensed odors substance will volatilize continuously within a short period, which results in the occurrence of odor.

Thus, if the surface of a base material of a heat exchanger has a high hydrophilicity, this will prevent an odors substance from being attached to the surface. This will result in the heat exchanger having a high odor resistance in regard to cigarette smoke.

The resin (D) according to the embodiments includes, based on 100% by mass of the resin (D), 38 to 40% by mass of polyvinyl alcohol (A), 22 to 24% by mass of a carboxylic monomer (B1), 15 to 17% by mass of an ethylene oxide-based monomer (B2), and 22 to 24% by mass of polyethylene glycol (C). When the contents of polyvinyl alcohol (A), a carboxylic monomer (B1), an ethylene oxide-based monomer (B2), and polyethylene glycol (C) are in the respective ranges indicated above, this results in obtaining a resin (coating) that has an excellent dispersion stability and a high hydrophilicity, and is less soluble even in fluid. Consequently, the resin (D) has a high odor resistance in regard to cigarette smoke. The resin (D) according to the embodiments may include, for example, various additives such as a solvent in a range in which such an inclusion does not prevent the resin (D) from having a high odor resistance in regard to cigarette smoke.

<Vanadium Compound>

A coating of the heat exchanger according to the embodiments includes a vanadium compound (E) in addition to the resin (D). This results in providing an antirust resin (D) having a high hydrophilicity. Examples of the vanadium compound (E) include vanadic sulfate, vanadic nitrate, vanadic phosphate, metavanadic acid, ammonium metavanadate, sodium metavanadate, potassium metavanadate, vanadium pentoxide, vanadium oxytrichloride, vanadium oxide, vanadium dioxide, vanadium oxyacetylacetonate, and vanadium chloride.

In the embodiments, a hydrophilizing agent includes, based on 100% by mass of the hydrophilizing agent: 90% by mass or more of a resin (D); and 0.8 to 1.8% by mass of a vanadium compound (E), calculated based on a vanadium element. Preferably, the hydrophilizing agent includes the resin (D) in a range of 95.8 to 98.1% by mass. When the contents of a resin (D) and a vanadium compound (E) are in the respective ranges indicated above, this results in obtaining a hydrophilizing agent that has a high odor resistance in regard to cigarette smoke while maintaining the properties of the resin (D) and the vanadium compound (E).

<Method for Producing Resin>

A method for producing a resin (D) according to the embodiments may include causing a (co)polymerization reaction in a dissolving solution containing EVOH (A) so as to obtain a radical polymer (B). Preferably, the method for producing a resin (D) includes causing a (co)polymerization reaction in a dissolving solution containing EVOH (A) and polyethylene glycol (C) so as to obtain a radical polymer (B). Conventionally known methods are used as a method for performing radial polymerization, and conventionally known agents are also used as a radical polymerization initiator.

When a copolymer of a first monomer group and a second monomer group is used as a radical polymer (B), the first monomer group and the second monomer group may be added to a solution containing EVOH (A) and polyethylene glycol (C) at the same time to perform copolymerization. Alternatively, the first monomer group may be added to a solution containing EVOH (A) and polyethylene glycol (C) to perform (co)polymerization, and the second monomer group may subsequently be added to perform (co)polymerization.

Instead of causing a (co)polymerization reaction in a dissolving solution containing EVOH (A), the production method according to the embodiments may include mixing a (co)polymer of the first monomer group and a (co)polymer of the second monomer group in the dissolving solution described above, so as to obtain the radical polymer (B) described above. For example, the method may include: (co)polymerizing the first monomer group in presence of EVOH (A) to obtain a (co)polymer (B1); adding, to the (co)polymer (B1), a (co)polymer (B2) obtained by separately polymerizing the second monomer group; and stirring the (co)polymer (B1) and the (co)polymer (B2) to mix them, so as to obtain an aqueous resinous dispersion.

An example of a method for producing an aqueous resinous dispersion according to the embodiments is described below. First, an adequate amount of a mixed solution of water and methanol is added to EVOH (A) in the form of pellets. After the addition, the solution is heated at a temperature that is at the glass transition point of EVOH or above and at the solvent boiling point or below, and stirred for a specified period of time, so as to obtain an EVOH (A) dissolving solution.

Next, a monomer liquid containing a carboxylic monomer (B1) is added dropwise to a solution obtained by dissolving polyethylene glycol (C) in the EVOH (A) dissolving solution. Further, a monomer liquid containing an ethylene oxide-based monomer (B2) is added dropwise. Then, a solution containing a radical polymerization initiator is added dropwise in a nitrogen atmosphere to cause a reaction.

Next, a base (preferably, ammonia water) in an amount equal to an acid equivalent in the blended monomers is added dropwise so as to perform neutralization. Then, methanol is distilled off while replenishing water under heating, and the medium is replaced by water.

After that, cooling and filtering are performed so as to obtain the resin (D) having an excellent dispersion stability according to the embodiments.

The hydrophilizing agent according to the embodiments may further include an antirust material other than a vanadium compound (E). For example, the hydrophilizing agent may further include a zirconyl compound, a titanium compound, a niobium compound, a phosphorus compound, a cerium compound, a chromium compound, and the like.

According to a function to be added, other components in a necessary amount may be added to the hydrophilizing agent according to the embodiments as long as the function described above is not hindered. For example, the other components may include a hydrophilic additive such as a surfactant, a colloidal silica, titanium oxide, and saccharides, an additive such as a tannic acid, imidazoles, triazines, triazoles, guanidines, and hydrazines, pigment, an antibacterial agent, a dispersion agent, a lubricant, a deodorant, a solvent, and the like.

The hydrophilizing agent according to the embodiments is obtained by mixing specified amounts of a resin (D) and a vanadium compound (E), and, in addition, specified amounts of a hydrophilic compound (F1), a crosslinker (F2), and an antirust material (G) as needed; and by stirring the obtained mixture well.

<Hydrophilization Method>

An example of a method for hydrophilizing a heat exchanger according to the embodiments is described below. The method for hydrophilizing a heat exchanger according to the embodiments includes coating and drying. In addition, before the coating, a conditioning of the surface of a base material, a formation of a chemical conversion coating, a primer formation, and water washing may be performed.

<Conditioning of Surface of Base Material>

The surface of an aluminum base material may be conditioned before the formation of a chemical conversion coating according to the embodiments. In the conditioning of the surface of a base material, soiling, uneven aluminum oxide film, flux, and the like that are on the surface of an aluminum base material are removed, so as to obtain a clean surface suitable to form a chemical conversion coating after the conditioning of the surface.

Spraying and dipping are examples of a method for performing coating with a base-material-surface conditioner. It is preferable that the temperature of the base-material-surface conditioner be from 10 to 70° C. When the temperature of the base-material-surface conditioner is lower than 10° C., there is a possibility that the surface will not be sufficiently cleaned and thus a surface suitable to form a desired chemical conversion coating will not be obtained. When the temperature of the base-material-surface conditioner is higher than 70° C., this may result in corrosion of a surface conditioning device or may result in scattering the mist of a base-material-surface conditioner so as to worsen the working environment.

It is preferable that the period of time for conditioning the surface of a base material be from 5 to 300 seconds. It is not preferable that the period of time for conditioning the surface of a base material be less than 5 seconds because the surface is not sufficiently cleaned. About 300 seconds of the period of time for conditioning the surface of a base material will be sufficient to obtain a surface suitable to form a desired chemical conversion coating.

<Coating>

The coating is coating the surface of the heat exchanger with a hydrophilizing agent. In this coating, the surface of the heat exchanger is coated with a hydrophilizing agent such that an attached amount of the hydrophilizing agent after the heat exchanger is dried, is from 0.5 to 2.0 g/m$^2$. Spraying and dipping are examples of the coating method.

<Drying>

The drying is drying the heat exchanger to form a hydrophilic coating. In this drying, the heat exchanger coated with a hydrophilizing agent is dried at a temperature from 140 to 170° C. When bake temperature is lower than 120° C., insufficient coating formation results and thus a coating less soluble even in fluid will not be obtained. When bake temperature exceeds 170° C., decomposition of a resin results and thus a highly hydrophilic coating will not be obtained. It is preferable that the period of time for drying be in a range of about 1 to 60 minutes.

As described above, the heat exchanger according to the embodiments is a heat exchanger having a hydrophilic coating on the surface of an aluminum base material of the heat exchanger, the hydrophilic coating being formed using a hydrophilizing agent including: 90% by mass or more of a resin (D); and 0.8 to 1.8% by mass of a vanadium compound (E), calculated based on a vanadium element, wherein the resin (D) includes 38 to 40% by mass of polyvinyl alcohol (A) having an ethylene chain, 22 to 24% by mass of a radically polymerizable monomer (B1) having a carboxylic acid, 15 to 17% by mass of a radically polymerizable monomer (B2) represented by Formula (1) described above, and 22 to 24% by mass of polyethylene glycol (C). This results in being able to obtain a heat exchanger that has a high odor resistance in regard to cigarette smoke.

Further, an attached amount of hydrophilic coating is from 0.5 to 2.0 g/m². This results in being able to obtain a heat exchanger having a sufficiently high odor resistance in regard to cigarette smoke.

The hydrophilization method according to the embodiments includes: coating the surface of a heat exchanger with a hydrophilizing agent; and drying the heat exchanger after the coating so as to form a hydrophilic coating. In the coating, the surface of the heat exchanger is coated with the hydrophilizing agent such that an attached amount of the hydrophilizing agent after the heat exchanger is dried is from 0.5 to 2.0 g/m². In the drying, the heat exchanger is dried at a temperature from 140 to 170° C. after the coating. This hydrophilization method can provide a heat exchanger having a high odor resistance in regard to cigarette smoke.

The present invention is not limited to the embodiments described above, and may include various modifications and alternations made within a range in which an object of the present invention can be achieved.

EXAMPLES

The present invention is described in more detail below using Examples. However, the present invention is not limited by these Examples.

Example of Producing Resin

Example 1

60 parts by mass of EVOH (A) in the form of pellets, and a mixed solution of water and methanol (mass ratio is water:methanol=1:1) were placed in a flask equipped with a stirrer, a cooler, a temperature controller, and two dropping funnels, where the mixed solution is nine times, in part by mass, as much as the EVOH (A) in the form of pellets. The obtained solution was heated at 75° C. and strongly stirred for an hour or more, so as to obtain an EVOH (A) dissolving solution.

Next, polyethylene glycol (C) having a weight average molecular weight of 20,000 was dissolved in the EVOH (A) dissolving solution, so as to obtain a mixed solution.

Next, a methanol solution of 40 parts by mass of an acrylic acid and an aqueous solution of 0.6 parts by mass of ammonium persulfate were placed in different dropping funnels, and were added dropwise to the mixed solution of EVOH (A) and polyethylene glycol (C) in a nitrogen atmosphere. A monomer liquid containing an ethylene oxide-based monomer (B2) was added dropwise to the mixture of EVOH (A) and polyethylene glycol (C). Here, the monomer liquid was continuously added dropwise for 30 minutes while maintaining the temperature of the solution at 75° C. After the dropwise addition was completed, the solution was continuously stirred at the same temperature for two hours.

Next, ammonia water (obtained by diluting with methanol in an amount equal to the amount of water in the ammonia water) in an amount equal to an acid equivalent in the blended monomers was added dropwise to the solution for about 20 minutes so as to perform neutralization. Then, a cooling tube for removing solvent was mounted, the solution was heated while replenishing water to distill off methanol, and the medium was replaced by water. After that, cooling and filtering were performed so as to obtain total 100 parts by mass of a resin (D) including 40 parts by mass of EVOH (A), 23 parts by mass of a carboxylic monomer (B1), 15 parts by mass of an ethylene oxide-based monomer (B2), and 22 parts by mass of polyethylene glycol (C).

Examples 2 to 7 and Comparative Examples 1 to 4

Regarding Examples 2 to 7 and Comparative Examples 1 to 4, the same procedure as in Example 1 was performed in the blending proportion given in Table 1 below. EVOH (A) and polyethylene glycol (C) were mixed and dissolved. An acrylic acid or an methacrylic acid that is used as a carboxylic monomer (B1), and an ethylene oxide-based monomer (B2) were mixed, and the mixture of the carboxylic monomer (B1) and the ethylene oxide-based monomer (B2), and an ammonium persulfate solution were separately added dropwise at the same time to perform polymerization. After neutralization was performed with ammonia water in an amount equal to an acid equivalent, methanol was replaced by water and then cooling and filtering were performed, so as to obtain a resin (D). Only in Comparative Example 1, the resin (D) was obtained without blending an ethylene oxide-based monomer (B2) and polyethylene glycol (C).

<Preparation of Hydrophilizing Agent>

The resin obtained in each of Examples and Comparative Examples, and ammonium metavanadate ($NH_4VO_3$) were mixed in the blending proportion (in the content) given in Table 1 to prepare the hydrophilizing agent of each of Examples and Comparative Examples. The content of vanadium calculated based on a vanadium element is given in Table 1, where the molecular weight of ammonium metavanadate is 117 and the atomic weight of vanadium is 51.

<Manufacturing of Testing Heat Exchanger>

An aluminum heat exchanger (an NB heat exchanger) for an automotive air conditioner was manufactured as a testing heat exchanger using a 1000 series aluminum material. After that, surface treatment was performed on the testing heat exchanger under the following treatment conditions.

(Treatment Conditions)

The surface of the testing heat exchanger was washed with hot water and subsequently washed with water. Next, the hydrophilizing agent obtained in each of Examples and Comparative Examples was adjusted to 5% solids, and the surface of the testing heat exchanger described above was dip-coated with the adjusted hydrophilizing agent. The heat exchanger was placed in a temperature environment of 160° C. for 30 minutes, so as to form a chemical conversion coating on the surface of the testing heat exchanger.

<Evaluation of Initial Odor>

An air-conditioner including the testing heat exchanger started operating, and a compressor of the testing heat exchanger was repeatedly turned on and off. An initial odor at each timing given in Table 1 was evaluated based on evaluation criteria below. The evaluation was performed by four monitors. The average of the evaluation criteria is given in Table 1. When the value of the evaluation criteria was less than 1.5, the resistance to an initial odor was considered good.

(Evaluation Criteria)

5: very strong odor
4: strong odor
3: easily perceivable odor

2: weak odor but what odor it is can be perceived (perceivable threshold)
1: barely perceivable odor (detectable threshold)
0: odorless

TABLE 1

| | | | | Example1 | Example2 | Example3 | Example4 | Example5 | Example6 | Example7 |
|---|---|---|---|---|---|---|---|---|---|---|
| (A) | | EVOH | Ethylene Proportion: 32% by mole | 40 | 40 | 39 | 40 | 38 | 38 | 39 |
| (B) | (B1) | Carboxylic Monomer | Acrylic Acid | 23 | 23 | 23 | 22 | 24 | 22 | — |
| | | | Methaerylic Acid | — | — | — | — | — | — | 22 |
| | (B2) | Ethylene Oxide-based Monomer | m = 34 R1 = R2 = Me | — | — | — | — | — | — | — |
| | | | m = 90 R1 = R2 = Me | — | 15 | — | — | 15 | — | — |
| | | | m = 113, R1 = R2Me | 15 | — | 15 | 16 | — | 16 | 15 |
| (C) | | Polyethlene Glycol | PEG20000 | 22 | 22 | 23 | 23 | 23 | 24 | 24 |
| Resin (Dispersion of (A)-(C) Above) in Total | | | | 100 | 100 | 100 | 100 | 100 | 100 | 100 |
| (D) | | Resin (Dispersion of (A)-(C) Above) | | 97.7 | 96.5 | 97.7 | 97.0 | 96.5 | 95.8 | 98.1 |
| (E) | | Ammonium Metavanadate | | 2.3 | 3.5 | 2.3 | 3.0 | 3.5 | 4.2 | 1.9 |
| | | Vanadium | | 1.0 | 1.5 | 1.0 | 1.3 | 1.5 | 1.8 | 0.8 |
| Evaluation of Initial Odor | | During Air Blowing | | 1.1 | 1.2 | 1.2 | 1.3 | 1.3 | 1.3 | 1.3 |
| | | Air Blowing Immediately After Operation of Air Conditioner is Completed(0~1 min) | | 1.2 | 1.2 | 1.2 | 1.3 | 1.2 | 1.3 | 1.2 |
| | | Air Blowing After Operation of Air Conditioner is Completed(1 min~5 min) | | 0.3 | 0.4 | 0.3 | 0.3 | 0.3 | 0.4 | 0.4 |
| Evaluation of Cigaret Smoke Oder | | During Air Blowing | | 1.4 | 1.4 | 1.3 | 1.3 | 1.3 | 1.3 | 1.3 |
| | | Air Blowing Immediately After Operation of Air Conditioner is Completed(0~1 min) | | 1.3 | 1.3 | 1.3 | 1.4 | 1.2 | 1.1 | 1.1 |
| | | Air Blowing After Operation of Air Conditioner is Completed(1 min~5 min) | | 1.1 | 1.2 | 1.1 | 1.1 | 1.1 | 1.2 | 1.2 |

| | | | | Comparative Example1 | Comparative Example2 | Comparative Example3 | Comparative Example4 |
|---|---|---|---|---|---|---|---|
| (A) | | EVOH | Ethylene Proportion: 32% by mole | 60 | 44 | 37 | 38 |
| (B) | (B1) | Carboxylic Monomer | Acrylic Acid | 40 | 21 | 27 | — |
| | | | Methaerylic Acid | — | — | — | 21 |
| | (B2) | Ethylene Oxide-based Monomer | m = 34 R1 = R2 = Me | — | — | — | 14 |
| | | | m = 90 R1 = R2 = Me | — | — | 14 | — |
| | | | m = 113, R1 = R2Me | — | 14 | — | — |
| (C) | | Polyethlene Glycol | PEG20000 | — | 21 | 27 | 20 |
| Resin (Dispersion of (A)-(C) Above) in Total | | | | 100 | 100 | 105 | 93 |
| (D) | | Resin (Dispersion of (A)-(C) Above) | | 95.3 | 95.3 | 95.3 | 98.8 |
| (E) | | Ammonium Metavanadate | | 4.7 | 4.7 | 4.7 | 1.2 |
| | | Vanadium | | 2.0 | 2.0 | 2.0 | 0.5 |
| Evaluation of Initial Odor | | During Air Blowing | | 1.5 | 1.2 | 1.2 | 1.2 |
| | | Air Blowing Immediately After Operation of Air Conditioner is Completed(0~1 min) | | 1.5 | 1.5 | 1.5 | 1.3 |
| | | Air Blowing After Operation of Air Conditioner is Completed(1 min~5 min) | | 1.0 | 0.2 | 0.3 | 0.2 |
| Evaluation of Cigaret Smoke Oder | | During Air Blowing | | 2.0 | 1.5 | 1.7 | 1.6 |
| | | Air Blowing Immediately After Operation of Air Conditioner is Completed(0~1 min) | | 2.3 | 2.0 | 2.0 | 2.0 |
| | | Air Blowing After Operation of Air Conditioner is Completed(1 min~5 min) | | 2.0 | 2.0 | 2.0 | 2.0 |

<Evaluation of Cigarette Smoke Odor>

An air-conditioner including the testing heat exchanger started operating after three cigarettes were smoked, and smoke from the cigarette became attached to the testing heat exchanger. After that, a compressor of the testing heat exchanger was repeatedly turned on and off, and cigarette smoke odor was evaluated based on evaluation criteria below, as in the case of the odor evaluation test described above. The evaluation was performed by four monitors. The average of the evaluation criteria is given in Table 1. When the value of the evaluation criteria was less than 1.5, the odor resistance in regard to cigarette smoke was considered good.
(Evaluation Criteria)
5: very strong odor
4: strong odor
3: easily perceivable odor
2: weak odor but what odor it is can be perceived (perceivable threshold)
1: barely perceivable odor (detectable threshold)
0: odorless

The invention claimed is:

1. A heat exchanger having a hydrophilic coating on a surface of an aluminum base material of the heat exchanger, the hydrophilic coating being formed using a hydrophilizing agent, wherein the hydrophilic coating comprises:

90% by mass or more of a resin (D); and 0.8 to 1.8% by mass of a vanadium compound (E), calculated based on a vanadium element, wherein the resin (D) comprises:

38 to 40% by mass of polyvinyl alcohol (A) having an ethylene chain;

22 to 24% by mass of a structure unit derived from a radically polymerizable monomer (B1) having a carboxylic acid;

15 to 17% by mass of a structure unit derived from a radically polymerizable monomer (B2) represented by Formula (1) below:

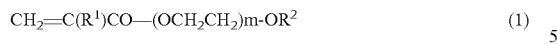 (1)

where $R^1$ represents H or $CH_3$, $R^2$ represents H or $CH_3$, and m represents an integer from 1 to 200; and 22 to 24% by mass of polyethylene glycol (C).

2. The heat exchanger according to claim 1, wherein an attached amount of the hydrophilic coating is from 0.5 to 2.0 g/m².

3. A method for hydrophilizing the heat exchanger according to claim 1, the method comprising:
   coating the surface of the heat exchanger with the hydrophilizing agent; and
   drying the heat exchanger after the coating so as to form a hydrophilic coating.

4. The method according to claim 3, wherein the coating includes coating the surface of the heat exchanger with the hydrophilizing agent such that an attached amount of the hydrophilizing agent after the drying is from 0.5 to 2.0 g/m².

5. The method according to claim 3, wherein the drying includes drying the heat exchanger at a temperature from 140 to 170° C. after the coating.

* * * * *